United States Patent [19]

Maack et al.

[11] Patent Number: 4,870,747

[45] Date of Patent: Oct. 3, 1989

[54] WIRE INSERTION TOOLING ASSEMBLY

[75] Inventors: Werner Maack, Seeheim; Richard Zendler, Erback, both of Fed. Rep. of Germany

[73] Assignee: AMP Incorporated, Harrisburg, Pa.

[21] Appl. No.: 247,803

[22] Filed: Sep. 22, 1988

[30] Foreign Application Priority Data

Sep. 25, 1987 [GB] United Kingdom ................. 8722564

[51] Int. Cl.[4] ........................ B23P 19/04; H01R 43/01

[52] U.S. Cl. ........................................ 29/753; 29/754; 29/755; 29/748; 29/861; 29/863; 29/865; 29/866; 269/229; 269/231

[58] Field of Search ................. 29/749, 751, 753, 754, 29/755, 748, 861, 863, 865, 866; 269/229, 234, 231

[56] References Cited

U.S. PATENT DOCUMENTS

| | | | |
|---|---|---|---|
| 3,766,622 | 10/1973 | Brehm | 29/755 |
| 4,027,368 | 6/1977 | Asick | 29/751 |
| 4,043,017 | 8/1977 | Folk et al. | 29/749 |
| 4,137,624 | 2/1979 | Davis et al. | 29/749 |
| 4,272,879 | 6/1981 | Wigby | 29/749 |
| 4,476,628 | 10/1984 | Kees | 29/755 |
| 4,784,669 | 11/1988 | Maack | 29/751 |

*Primary Examiner*—P. W. Echols
*Assistant Examiner*—K. Jordan
*Attorney, Agent, or Firm*—Thomas G. Terrell; Bruce J. Wolstoncroft

[57] ABSTRACT

The assembly comprises a first slide (34) carrying a wire insertion tool (38) and a second slide (80) carrying support tools (92). As the slide (34) descends through a working stroke to cause the wire insertion tool (38) to insert a wire (W) into the wire slot (18) of an electrical terminal (10') of a multicontact electrical connector (2), support noses (96) of the support tools (92) which are in an open position, enter the mouths of the wire slots (18) of the next adjacent terminals. The wire insertion tool (38) continues to descend past the noses (96) to insert the wire (W) into the slot (18) of the terminal (10') and the support tools (92) close so that their noses (96) engage the terminals (10) on either side of the terminal (10') to be loaded with wire, thereby to restrain splaying of that terminal (10') as the wire (W) is inserted into its wire slot (18).

9 Claims, 5 Drawing Sheets

WIRE INSERTION TOOLING ASSEMBLY

BACKGROUND OF THE INVENTION

This invention relates to a wire insertion tooling assembly for inserting an electrical wire into a wire slot in a wire connecting portion of an electrical terminal, the assembly comprising a wire insertion tool mounted in a frame for movement relative thereto through a wire insertion stroke and a return stroke.

Such wire slots are normally dimensioned to receive wires of a range of wire gauges. Especially where the wire to be inserted into the wire slot is one of the larger gauges of the range, the insertion of the wire into the slot may tend to overstress the wire connecting portion, so that it takes on a permanent set, whereby the integrity of the electrical connection between the wire and the edges of the slot is impaired.

SUMMARY OF THE INVENTION

According to the invention, a tooling assembly, as defined in the first paragraph of this specification, is characterized by a wire connecting portion support tool mounted in the frame on each side of the wire insertion tool and having a wire connecting portion support surface facing the wire insertion tool, said support tools being driven in the same direction as the wire insertion tool during its working and its return strokes and being relatively movable during said working stroke, between a first position in which said support surfaces are spaced from each other to receive said wire connecting portion between them and a second position in which said wire supporting surfaces serve to support said wire connecting portion on either side of the slot therein as the wire is being inserted thereinto by the wire inserting tool, said support tools returning to their first position as the wire insertion tool is moved through its return stroke.

Where the tooling assembly is used to insert a wire into the wire-slot of a wire connecting portion of a terminal of a multicontact electrical connector, in which the terminals thereof are arranged in a row with partitions of the connector housing interposed between the wire connecting portions of the terminals, the support surfaces of the support tools may be arranged to support the partitions on either side of the wire connecting portion into the wire slot of which the wire is to be inserted. In this case, the support surfaces of the support tools may be arranged to engage the wire connecting portions of adjacent terminals so as to urge these against the partitions.

The wire insertion tool may be mounted on a first slide in the frame, the support tools being pivoted to a second slide in the frame connected to the first slide by lost motion means so that during the working stroke of the wire insertion tool, the wire insertion tool moves ahead of the support tools when they are in their second position, to insert the wire into the slot.

The support tools may be moved between their first and their second positions by camming means provided on the insertion tool, the support tools, and on an extension of the first slide, said second slide being disposed between the extension and the first slide.

The lost motion means may comprise springs connecting the first and second slides, the extension serving to drive the second slide towards the first slide and against a first stop on the frame, to a starting position, during the return stroke of the wire insertion tool, the movement of the second slide, during the working stroke of the wire insertion tool, being limited by a second and opposite stop on the frame.

In practice, the working and the return strokes of the wire insertion tool, and the movements of the support tools in the direction of said strokes, will be vertical and rectilinear.

DESCRIPTION OF THE PREFERRED EMBODIMENT

Figure 1:
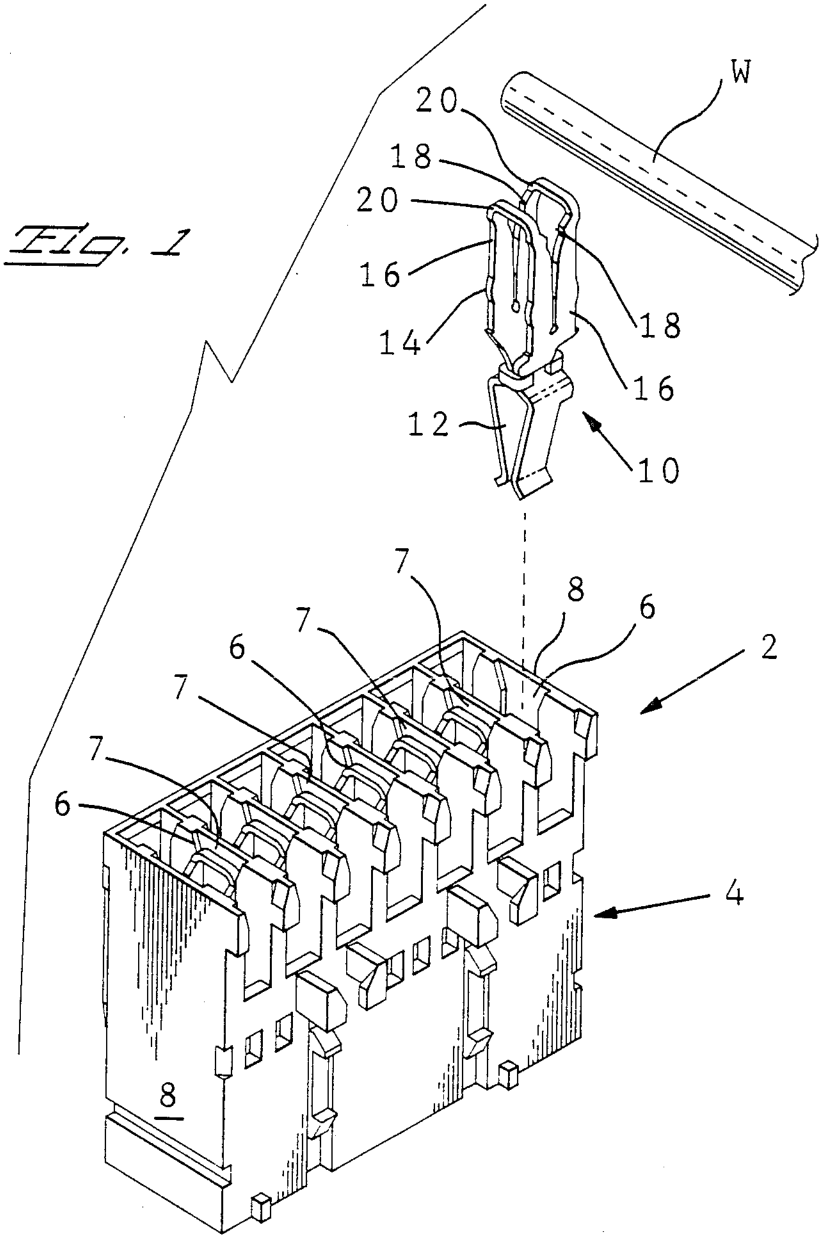
FIG. 1 is an isometric view of an electrical connector comprising an insulating housing and electrical terminals, only one of which is shown, exploded from the housing, the FIG. also showing an electrical wire positioned for insertion into wire slots of the terminal.

As shown in FIG. 1, an electrical connector 2 comprises an elongate insulating housing 4, which is formed with a row of terminal receiving cavities 6, said row extending lengthwise of the housing 4. The cavities 6 are separated from one another by partitions 7 extending across the housing 4, the two end cavities each being defined between one of the partitions 7 and an end wall 8 of the housing 4. Each cavity 6 receives an electrical terminal 10, only one of which is shown in FIG. 1, and which comprises a tab receptacle portion 12 and a wire connecting portion 14. The wire connecting portion 14 comprises a pair of parallel plates 16 each formed with a wire slot 18. The plates 16 are connected together at their upper ends by means of straps 20 of the terminal material. An insulated electrical wire W can be driven down between the straps 20 and inserted into the wire slots 18 in a direction at right angles to the longitudinal axis of the wire W, by means of the tooling assembly to be described herein, so that the edges of the wire slots 18 pierce the insulation of the wire W to make permanent electrical contact with the electrically conductive core thereof.

Figure 1A:
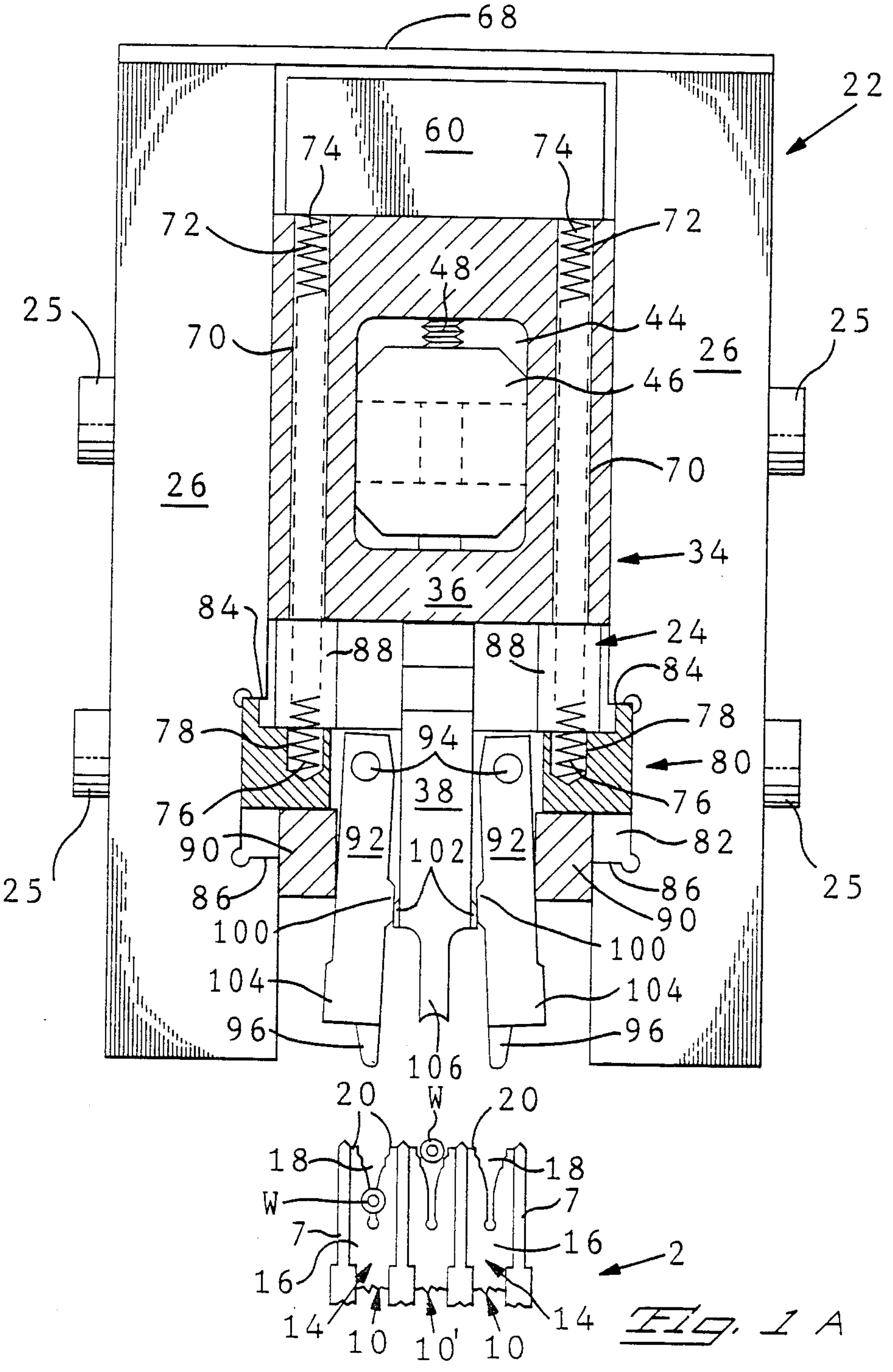
FIG. 1A is a front view, shown partly in section, of a wire insertion tooling assembly showing tooling thereof prior to carrying out a wire insertion working stroke.
Figure 1B:
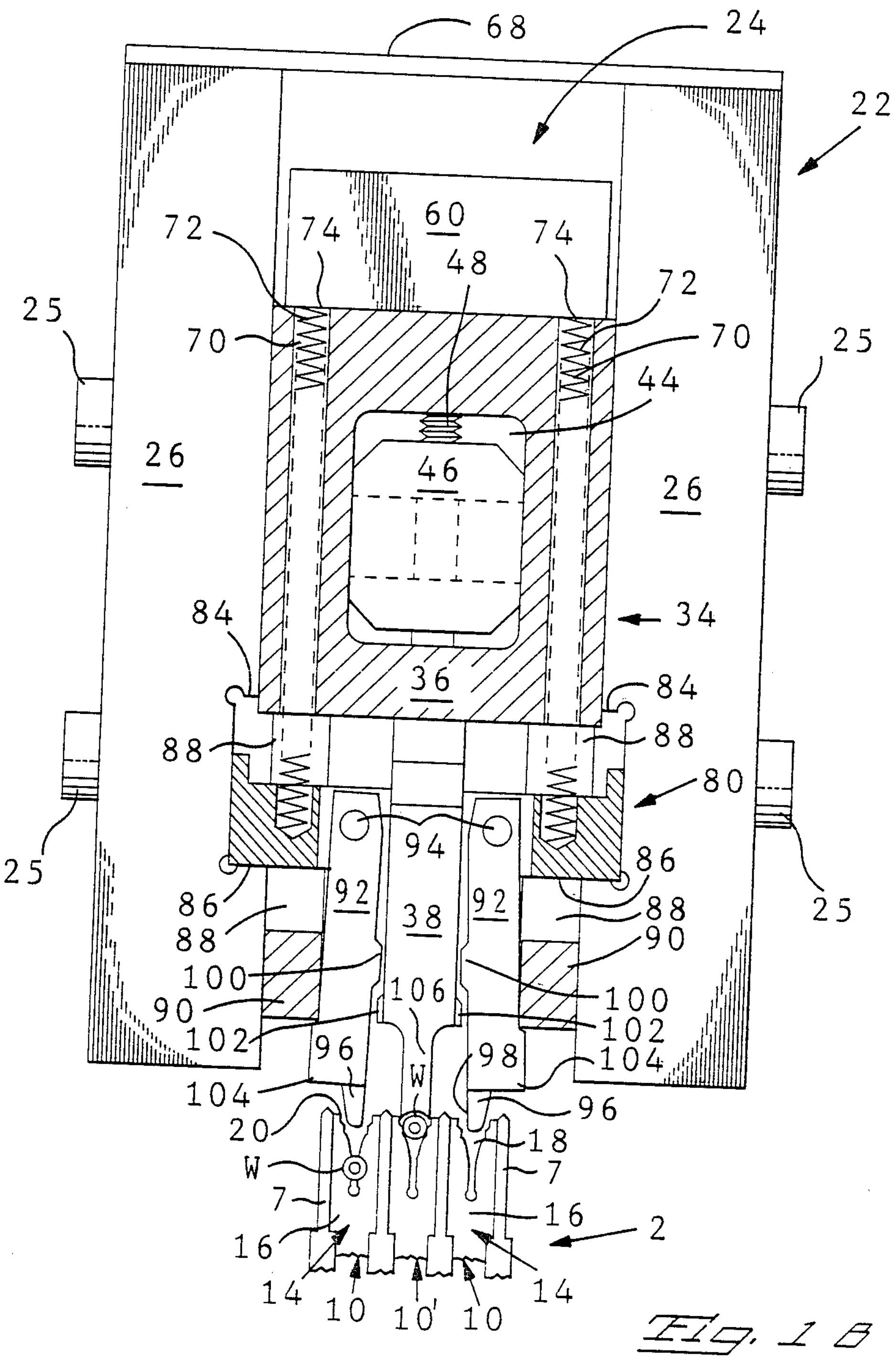
FIG. 1B similar view to that of FIG. 1, but showing the tooling at an intermediate stage during said working stroke.
Figure 1C:
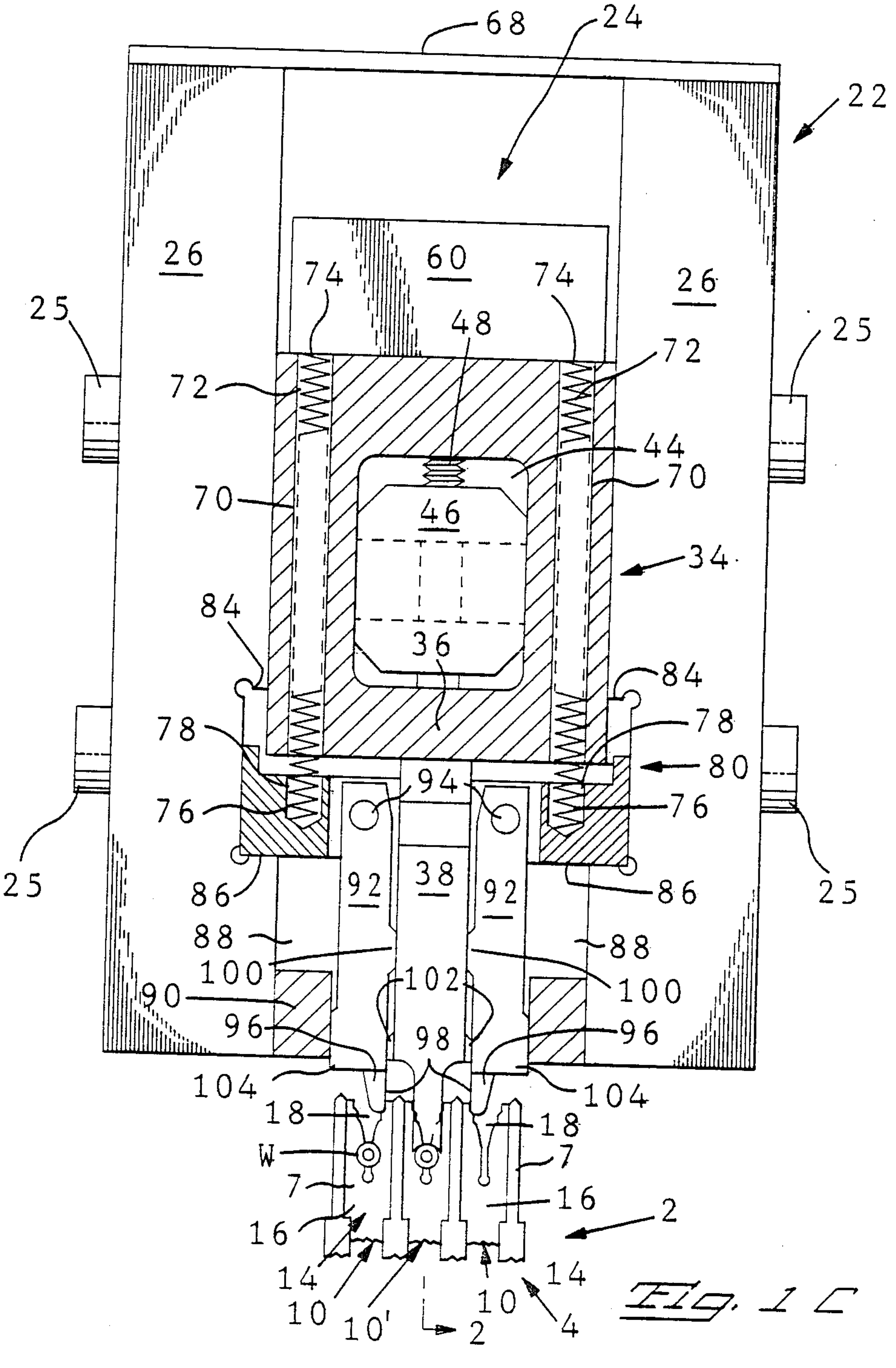
FIG. 1C is a similar view to that of FIGS. 1A and 1B, but showing the tooling at the end of said working stroke.
Figure 2:
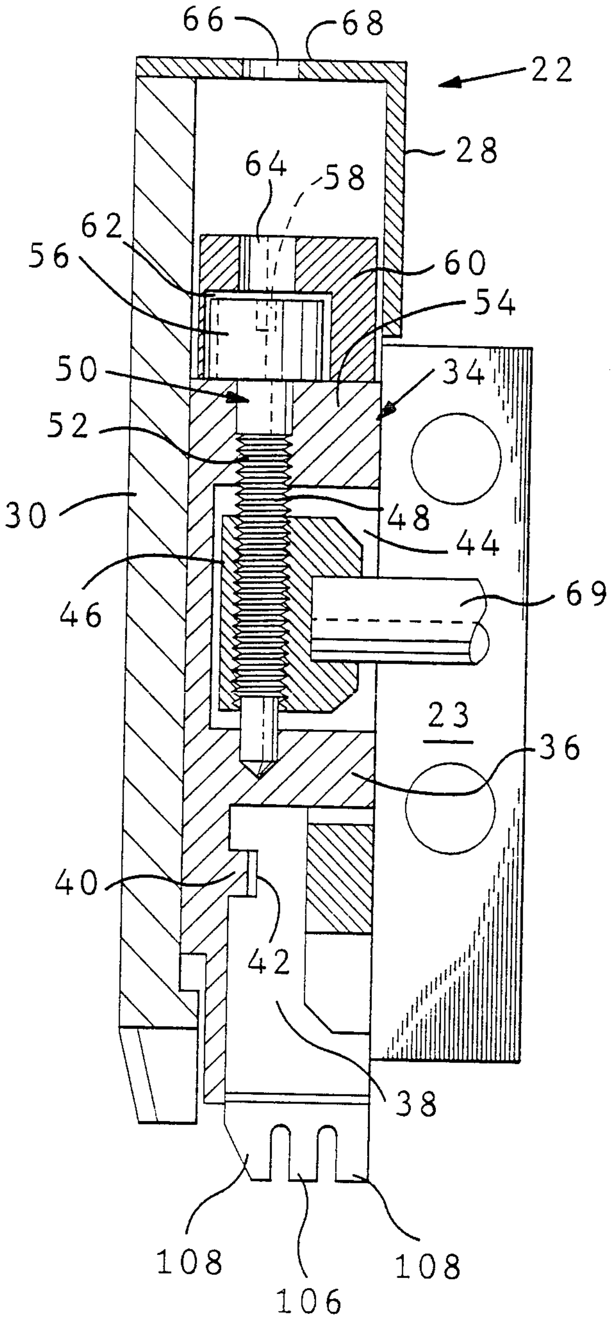
FIG. 2 is a view of the tooling assembly taken on the lines 2—2 of FIG. 1C.

As shown in FIGS. 1A, 1B, 1C and 2, the wire insertion tooling assembly comprises a frame 22 which is fixed to a support at a work station (not shown of a wire insertion machine by means of mounting plates 23 (only one of which is shown, in FIG. 2) secured-to the frame 22 by means of fasteners 25. The frame 22 comprises a vertical slide way 24 defined by a pair of uprights 26, a rear plate 28, and a front plate 30 (FIG. 2). There is mounted for vertical reciprocating movement in the slideway 28, an insertion tool ,carrying, first slide generally referenced 34, the insertion tool carrying first slide comprising a main slide member 36 to the lower part of which is keyed a wire insertion tool 38, by means of a key 40 on the member 36, which engages in a keyway 42 in the tool 38 as shown in FIG. 2. The member 36 has a rectangular opening 44 containing a nut 46 threadedly receiving a screw threaded portion 48 of a bolt 50, the portion 48 also threadedly engaging in a tapped countersunk bore 52 in a bridge 54 of the member 36 providing the top wall of the opening 44. The bolt 50 has a head 56 engaging the upper face of the bridge 54 and having a slot 58 for receiving the blade of a screwdriver. There is secured to the bridge 54 a spring abutment block 60 formed with an opening 62 receiving the nut head 56, and with a bore 64 aligned with an opening 66 in a top plate 68 of the frame 22 to allow access for the screwdriver to adjust the vertical position of the nut 46 in the opening 44, and thus the insertion depth of the tool 38. The nut 46 has a horizontal blind bore receiving a shaft 69 on a driven ram (not shown) for driving the slide 34 in vertical reciprocating motion.

As shown in FIGS. 1A to 1C, the slide member 36 is formed with vertical bores 70 receiving coil springs 72, which depend below the member 36. The upper ends 74 of the springs 72 engage the block 60, the lower ends 76 thereof being received in blind bores 78 in a supporting tool carrying second slide 80, below the slide member 36.

The slide 80 is vertically slidable in a second slideway 82 which is a continuation of the slideway 24 but is somewhat wider, so as to accommodate the slide 80 which is wider than the member 36. The slide 80 is vertically slidable in the slideway 82 to an extent limited in the upward direction by upper shoulders 84 formed in the uprights 26 and in a downward direction by lower shoulders 86 formed therein. The slide member 36 has formed integrally therewith, a pair of yokes 88 which extend downwardly below the slide 80 and comprise cross pieces 90 there below for raising the slide 80 and which also have a camming function, as described below. The slide 80 carries a pair of elongate, terminal support tools 92, the upper end of each of which is pivoted in the slide 80 on a horizontal pivot pin 94, for angular movement in a vertical plane, relative to the tool 38. Each tool 92 has, depending from its lower end, a terminal support nose 96 having a terminal support inner surface 98 facing the wire insertion tool 38. Intermediate its ends, each tool 92 has on its inner face, a camming projection 100 facing the tool 38 for cooperation with a respective outwardly directed camming projection 102 on the tool 38, each tool 92 having on its outer face and proximate to its lower end, a camming projection 104 for cooperation with a respective cross piece 90. The tool 38 has at its lower end, a downwardly directed insertion punch 106 dimensioned for insertion between the straps 20 of a terminal 10 and on either side of the punch 106, respective wire hold down lugs 108 (FIG. 2) for holding down a wire W as it is inserted into the wire slots 18 of a terminal 10.

FIGS. 1A to 1C show, in fragmentary form, a connector 2 to be loaded with wires W by means of the tooling assembly described above, and being supported therebelow on an anvil (not shown).

When loading the connector 2 with wires, especially where the wires are within the larger gauge range of wires, which the wire slots 18 of the terminals 10 are designed to accommodate, the insertion of a wire W into the wire slots 18 of a terminal 10', may cause the plates 16 of the portion 14 of the terminal to be splayed away from the respective wire slots 18, so as to take on a permanent set, thereby impairing the integrity of the electrical connection between the core of the wire W an the edges of the wire slots 18 of the portion 14, and may also cause the partitions 7 bounding the cavity 6 in which the terminal 10, is received also to be splayed apart and thereby damaged. In order to avoid such distortion of the portion 14 and the partitions 7, the support tools 92 are arranged to engage a strap 20 of each terminal 10 on either side of a terminal 10', which is to be loaded with a wire W by means of the tool 38, so as to support the plates 16 of the portion 14 of the terminals 10, from both sides as shown in FIG. 1C, thereby preventing the plates 16 of the terminal 10, and the adjacent partitions 7 from being splayed apart as a result of the wire insertion operation.

FIG. 1A shows the tooling of the assembly prior to carrying out a wire insertion working stroke. In this position of the parts, the ram driving the shaft 69 is in its top dead center position, so that the slide 34 is in its uppermost position in the slideway 24, the slide 80 being urged against the shoulders 84 by the cross pieces 90 of the yokes 88, against the action of the springs 72. The camming projections 100 on the tools 92 are in engagement with the camming projections 102 of the tool 38, so that the tools 92 are cammed apart about their pivot pins 94 and are therefore in a first angular position in which the noses 96 of the tools 92 are spaced apart from one another by a maximum distance, the tools 92 being secured in this position between the projections 102 and the cross pieces 90. As the slide 34 is driven through its working stroke by the ram, with a wire W having been positioned by the operator between the straps 20 of the center terminal 10', as shown in FIG. 1A, the slide 80 is depressed by the springs 72 so as to engage, and thus to be stopped by the shoulders 86, as shown in FIG. 1B. As the punch 106 of the tool 38 to move the wire W down in the slot 18 of the center terminal 10', the noses 96 of the tools 92 enter between the straps 20 of the respective terminals 10 on either side of the center terminal 10', whilst the cross pieces 90 begin to engage the cam surfaces 104 of the camming projections 106 of the tools 92, until, as shown in FIG. 1C, the cross pieces 90 cam the tools 92 towards the tool 38 to an extent limited by the engagement of the cam projections 100 of the tools 92 against the tool 38 and the engagement of the cam projections 102 of the tool 38 against the tools 92. Each tool 92 is thereby moved to a second angular position in which the terminal supporting surface 98 of its nose 96 engages against that strap 20 of the respective terminal 10, which strap 20 is nearest to the portion 14 of the center terminal 10, The partitions 7 on either side of the center terminal 10, and thereby the plates 16 thereof are supported from both sides by the tools 96, against outward splaying, as a result of the wire W being forced into the slots 18 of the center terminal 10', as shown in FIG. 1C.

As the ram drives the slide 34 through an upward return stroke, the cross pieces 90 leave the cam projections 104 of the tools 92, so that the tools 92 swing away from the tool 38 to the positions of equilibrium about their pivot pins 94 in which the tools 92 are shown in FIG. 1B, thus enabling the slide 34 to be returned to its FIG. 1A position to complete the return stroke of the tooling, without the noses 96 interfering with the straps 20 of the two outer terminals 10.

When the two end terminals of the connector 2 are loaded with wires, one of the noses 96 will engage the outer surface of the respective end wall 8, which is slightly thicker than the partitions 7. Where a terminal in a cavity 6 has no straps 20, the respective nose 96 engages the appropriate sidewall 7 of the cavity.

We claim:

1. A wire insertion tooling assembly for inserting an electrical wire into a wire slot in a wire connecting portion of an electrical terminal, the assembly having a wire insertion tool mounted in a frame for movement relative thereto through a wire insertion stroke and a return stroke, the wire insertion tool comprising wire connecting portion support tools mounted in the frame on each side of the wire insertion tool and having wire connection portion support surfaces facing the wire insertion tool, said wire connecting portion support tools being driven in the same direction as the wire insertion tool during working and return strokes and being relatively moveable with respect to the wire insertion tool during said working stroke between a first position in which said support surfaces are spaced from each other to receive respective wire connecting portions between them and a second position in which said supporting surfaces serve to support said wire connecting portion on either side of the wire slot therein as the wire is being inserted thereinto by the insertion tool said support tools returning to their first position as the wire insertion tool is moved through its return stroke.

2. An assembly as recited in claim 1 wherein the wire insertion tool is mounted on a first slide which is slidable in the frame to drive the wire insertion tool through its working and its return strokes, the support tools being mounted on a second slide for movement between said first and second positions, the second slide being drivable by the first slide through lost motion means.

3. An assembly as recited in wherein the support tools are elongate in the direction of movement of the slides, each support tool being pivotally mounted to the second slide at one end and having at the other end a nose providing the support surfaces of the support tool.

4. An assembly as recited in claim 3 wherein the support tools are moved between their first and second positions by cooperating camming means on the insertion tool and the support tools and cooperating camming means on the support tools and on the first slide.

5. An assembly as recited in claim 4, wherein the camming means of the first slide comprises a camming member provided on an extension of the first slide, the second slide being arranged intermediate the camming member and the first slide.

6. An assembly as recited in claim 3 or 4, wherein said lost motion means comprises resilient means connecting said first and second slides for movement with one another, said slides being mounted in the frame for vertical reciprocating movement, the movement of the second slide being limited by vertically displaced stops of the frame.

7. An assembly as recited in claim 6, wherein a pair of yokes depending from the first slide and each having a cross piece below the second slide, said cross pieces serving to drive the second slide against the upper stop during the return stroke of the wire insertion tool and to cam the support tools towards the insertion tool towards the end of the working stroke of the latter, to cause the support tools to assume their second position.

8. An assembly as recited in claim 2 wherein said lost motion means serve to allow the wire insertion tool to advance beyond the support tools when the support tools are in their second position.

9. An assembly as recited in claim 7 wherein said lost motion means serve to allow the wire insertion tool to advance beyond the support tools when the support tools are in their second position.

* * * * *